United States Patent
Dettinger et al.

(10) Patent No.: US 8,112,459 B2
(45) Date of Patent: Feb. 7, 2012

(54) CREATING A LOGICAL TABLE FROM MULTIPLE DIFFERENTLY FORMATTED PHYSICAL TABLES HAVING DIFFERENT ACCESS METHODS

(75) Inventors: Richard D. Dettinger, Rochester, MN (US); Daniel P. Kolz, Rochester, MN (US); Richard J. Stevens, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1746 days.

(21) Appl. No.: 11/016,203

(22) Filed: Dec. 17, 2004

(65) Prior Publication Data

US 2006/0136469 A1   Jun. 22, 2006

(51) Int. Cl.
G06F 17/30 (2006.01)
(52) U.S. Cl. .................................. 707/810; 707/781
(58) Field of Classification Search .............. None
See application file for complete search history.

(56) References Cited

U.S. PATENT DOCUMENTS

| | | | |
|---|---|---|---|
| 5,345,586 A | 9/1994 | Hamala et al. | |
| 5,369,778 A | 11/1994 | San Soucie et al. | |
| 5,404,510 A * | 4/1995 | Smith et al. | 707/2 |
| 5,412,804 A | 5/1995 | Krishna | |
| 5,418,950 A * | 5/1995 | Li et al. | 707/4 |
| 5,471,611 A | 11/1995 | McGregor | |
| 5,506,984 A | 4/1996 | Miller | |
| 5,515,488 A | 5/1996 | Hoppe et al. | |
| 5,592,663 A | 1/1997 | Nagamori | |
| 5,630,121 A | 5/1997 | Braden-Harder et al. | |
| 5,701,453 A | 12/1997 | Maloney et al. | |
| 5,734,887 A * | 3/1998 | Kingberg et al. | 707/4 |
| 5,761,654 A | 6/1998 | Tow | |
| 5,809,497 A | 9/1998 | Freund et al. | |
| 5,918,232 A | 6/1999 | Pouschine et al. | |
| 5,943,666 A | 8/1999 | Kleewein et al. | |
| 5,987,446 A | 11/1999 | Corey et al. | |
| 5,999,933 A * | 12/1999 | Mehta | 707/100 |
| 6,003,034 A | 12/1999 | Tuli | |
| 6,009,422 A | 12/1999 | Ciccarelli | |
| 6,061,506 A | 5/2000 | Wollaston et al. | |
| 6,233,586 B1 | 5/2001 | Chang et al. | |
| 6,377,943 B1 | 4/2002 | Jakobsson | |
| 6,397,223 B1 * | 5/2002 | Kori | 707/102 |
| 6,442,543 B1 | 8/2002 | Snodgrass et al. | |

(Continued)

OTHER PUBLICATIONS

Dettinger et al., IBM U.S. Appl. No. 10/083,075 (ROC920020044US1), filed Feb. 26, 2002, "Application Portability and Extensibility Through Database Schema and Query Abstraction".

(Continued)

Primary Examiner — Thu-Nguyet Le
(74) Attorney, Agent, or Firm — Patterson & Sheridan LLP

(57) ABSTRACT

Embodiments of the present invention provide methods for constructing a database abstraction model that includes logical fields that map to a logical table. The logical table is constructed using data extracted from multiple, differently formatted physical tables. The logical table allows logically related data stored in multiple databases to appear as data from a single table. Relationships between data stored in multiple, differently formatted databases are maintained and logical fields that include multiple access methods that map to the multiple databases are replaced with a single access method that maps to the logical table. Data relationships that are defined for the database abstraction model are modified to reflect the logical table.

25 Claims, 12 Drawing Sheets

U.S. PATENT DOCUMENTS

| | | |
|---|---|---|
| 6,457,009 B1 | 9/2002 | Bollay |
| 6,460,043 B1 | 10/2002 | Tabbara et al. |
| 6,513,041 B2 | 1/2003 | Tarin |
| 6,553,368 B2 | 4/2003 | Martin et al. |
| 6,567,802 B1 | 5/2003 | Popa et al. |
| 6,601,065 B1 | 7/2003 | Nelson et al. |
| 6,609,123 B1 | 8/2003 | Cazemier et al. |
| 6,611,838 B1 | 8/2003 | Ignat et al. |
| 6,643,633 B2 | 11/2003 | Chau et al. |
| 6,651,055 B1 | 11/2003 | Kilmer et al. |
| 6,725,225 B1 | 4/2004 | Kori |
| 6,725,227 B1 | 4/2004 | Li |
| 6,820,076 B2 | 11/2004 | Bailey et al. |
| 6,928,431 B2 | 8/2005 | Dettinger et al. |
| 6,954,748 B2 | 10/2005 | Dettinger et al. |
| 6,978,324 B1 | 12/2005 | Black |
| 6,985,912 B2 | 1/2006 | Mullins et al. |
| 6,996,558 B2 | 2/2006 | Dettinger et al. |
| 7,054,877 B2 | 5/2006 | Dettinger et al. |
| 7,249,118 B2 | 7/2007 | Sandler et al. |
| 7,333,981 B2 | 2/2008 | Dettinger et al. |
| 7,363,287 B2 | 4/2008 | Kilmer et al. |
| 7,398,263 B2 | 7/2008 | Dettinger et al. |
| 7,461,052 B2 | 12/2008 | Dettinger et al. |
| 7,526,471 B2 | 4/2009 | Dettinger et al. |
| 7,539,662 B2 | 5/2009 | Dettinger et al. |
| 7,805,435 B2 | 9/2010 | Dettinger et al. |
| 2001/0016843 A1 | 8/2001 | Olson et al. |
| 2002/0026630 A1 | 2/2002 | Schmidt et al. |
| 2002/0078008 A1 | 6/2002 | Cambot et al. |
| 2002/0078068 A1 | 6/2002 | Krishnaprasad et al. |
| 2002/0091702 A1 | 7/2002 | Mullins |
| 2002/0091990 A1 | 7/2002 | Little et al. |
| 2002/0116357 A1 | 8/2002 | Paulley |
| 2002/0123984 A1 | 9/2002 | Prakash |
| 2003/0046390 A1 | 3/2003 | Ball et al. |
| 2003/0167274 A1 | 9/2003 | Dettinger et al. |
| 2003/0172056 A1 | 9/2003 | Dettinger et al. |
| 2003/0208458 A1 | 11/2003 | Dettinger et al. |
| 2003/0212666 A1 | 11/2003 | Basu et al. |
| 2003/0214525 A1 | 11/2003 | Esfahany |
| 2003/0217033 A1 | 11/2003 | Sandler et al. |
| 2004/0039736 A1 | 2/2004 | Kilmer et al. |
| 2004/0039820 A1 | 2/2004 | Colby et al. |
| 2004/0148278 A1 | 7/2004 | Milo et al. |
| 2004/0172305 A1 | 9/2004 | Soerensen et al. |
| 2004/0199524 A1 | 10/2004 | Rys et al. |
| 2004/0254939 A1 | 12/2004 | Dettinger et al. |
| 2004/0260675 A1 | 12/2004 | Bruno et al. |
| 2004/0260685 A1 | 12/2004 | Pfleiger et al. |
| 2004/0260691 A1 | 12/2004 | Desai et al. |
| 2004/0260706 A1 | 12/2004 | Anonsen et al. |
| 2004/0267760 A1 | 12/2004 | Brundage et al. |
| 2005/0193114 A1 | 9/2005 | Colby et al. |
| 2006/0010127 A1 | 1/2006 | Dettinger et al. |
| 2006/0047638 A1 | 3/2006 | Dettinger et al. |
| 2006/0136382 A1 | 6/2006 | Dettinger et al. |
| 2008/0071760 A1 | 3/2008 | Dettinger et al. |
| 2008/0091668 A1 | 4/2008 | Dettinger et al. |
| 2008/0215611 A1 | 9/2008 | Dettinger et al. |
| 2008/0215612 A1 | 9/2008 | Dettinger et al. |
| 2009/0182708 A1 | 7/2009 | Dettinger et al. |

OTHER PUBLICATIONS

Dettinger et al., IBM U.S. Appl. No. 11/005,418 (ROC920040198US1), filed Dec. 6, 2004, "Abstract Query Plan".

Batory et al., "Implementing a Domain Model for Data Structures[1, 2]," *International Journal of Software Engineering and Knowledge Engineering*, Sep. 1992, vol. 2(3): pp. 375-402.

Calmet et al., "A generic query-transaction framework for a mediator architecture," *Proceedings of the 13th International Conference on Data Engineering*, Apr. 1997: pp. 434-443.

Tzy-Hey Chang et al., "A Universal Relation Data Model with Semantic Abstractions" *IEEE Transactions on Knowledge and Data Engineering*, Feb. 1992, vol. 4(1): pp. 23-33.

Franconi et al., "A Data Warehouse Conceptual Data Model for Multidimensional Aggregation," *Proceedings of the International Workshop on Design and management of Data Warehouses* (DMDW '99, 1999: pp. 13-1-13-10.

Lerm et al., "Cooperative access to relational and object-oriented federated databases," *IEEE Proceedings of the Fourth Workshop on Future Trends of Distributed Computing Systems*, Sep. 1993: pp. 222-227.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering*, Apr. 1995, vol. 7(2): pp. 228-245.

S. D. Urban et al., "Delta abstractions: A technique for managing database states in runtime debugging of active database rules," *IEEE Transactions on Knowledge and Data Engineering*, May/Jun. 2003, vol. 15(3): pp. 597-612.

* cited by examiner

LOGICAL TABLE : DEMOGRAPHIC

LOGICAL TABLE : DEMOGRAPHIC

| DATA ABSTRACTION MODEL |
|---|
| Field :<br>  Name = "ID"<br>  Access Method = "Simple"<br>    Table = "logtabschema.Demographic.ID"<br>    Column = "ID" |
| Field :<br>  Name = "Name"<br>  Access Method = "Simple"<br>    Table = "logtabschema.Demographic.ID"<br>    Column = "Name" |
| Field :<br>  Name = "Birthdate"<br>  Access Method = "Simple"<br>    Table = "logtabschema.Demographic.ID"<br>    Column = "Birthdate" |
| Field :<br>  Name = "Deathdate"<br>  Access Method = "Simple"<br>    Table = "logtabschema.Demographic.ID"<br>    Column = "Deathdate" |
| Relations :<br>  logtabschema.Demographic.ID =<br>  DS1.Tests.ID |

CREATING A LOGICAL TABLE FROM MULTIPLE DIFFERENTLY FORMATTED PHYSICAL TABLES HAVING DIFFERENT ACCESS METHODS

CROSS-REFERENCE TO RELATED APPLICATIONS

This application is related to a commonly owned, co-pending application U.S. patent application Ser. No. 10/083,075, filed Feb. 26, 2002, entitled "Application Portability and Extensibility through Database Schema and Query Abstraction" which is incorporated herein by reference in its entirety. This application is also related to commonly assigned, U.S. Patent Application entitled "Well Organized Query Result Sets", filed Dec. 17, 2004 as U.S. application Ser. No. 11/016,202, commonly assigned, U.S. Patent Application entitled "Abstract Query Plan", filed Dec. 06, 2007 as U.S. patent application Ser. No.: 11/005,418, commonly assigned, U.S. Patent Application entitled "Field to Field Join Constraints", filed Dec. 17, 2004 as U.S. patent application Ser. No.: 11/016,215 and commonly assigned, U.S. Patent Application entitled "Transformation of a Physical Query into an Abstract Query", filed Dec. 17, 2004 as U.S. patent application Ser. No. 11/016,201, which are incorporated herein by reference in their entirety.

BACKGROUND OF THE INVENTION

1. Field of the Invention

The present invention relates to computer databases. More particularly, the present invention relates to techniques for creating a database abstraction model over of a set of individual, differently formatted databases used to store logically similar or related data.

2. Description of the Related Art

Databases are well known systems for information storage and retrieval. The most prevalent type of database used today is the relational database, a tabular database in which data is defined so that it can be reorganized and accessed in a number of different ways. A relational database management system (DBMS) uses relational techniques for storing and retrieving data.

A database schema describes the structure of a database. For example, a relational schema describes a set of tables, columns, and primary and foreign keys defining relationships between the tables. Applications are developed that query data according to the database schema. For example, relational databases are commonly accessed using a front-end query application that is configured to perform data access routines, including searching, sorting, and query composition routines. Front-end applications query data according to the relational schema. At the back-end, software programs control data storage and respond to requests (queries) sent by users interacting with the front-end.

Every year, entities spend millions of dollars on data-modeling experts to design data warehouses. A data warehouse provides a central repository for an aggregation of data from many sources into a single, centralized database. Data warehousing, however, is often not an appropriate or even workable model. In some cases, the amount of data is too large or too rapidly changing to be aggregated into a single location. This is the case, for example, with many large bio-informatics databases. In other cases, the number of data sources can be very large, making the cost of creating a data warehouse prohibitive.

One alternative to data warehousing is database federation. Database federation allows relational tables on remote systems to appear as tables on a local system. A federated database is logical union of multiple underlying databases running on independent servers that do not share common resources and are connected across a network. Applications may then be configured to access data from the remote systems without the need to aggregate the data in a data warehouse.

Commonly assigned U.S. patent application Ser. No. 10/083,075 (the '075 application), filed Feb. 26, 2002, entitled "Application Portability and Extensibility through Database Schema and Query Abstraction", discloses a framework that provides an abstract view of an underlying database system and schema. The framework of the '075 application provides a requesting entity (i.e., an end-user or front-end application) with an abstract representation of data stored in an underlying physical storage mechanism, such as a relational database. In this way, the requesting entity is decoupled from the underlying physical data when accessing the underlying DBMS. Abstract queries based on the framework can be constructed without regard for the makeup of the physical data. Further, changes to the physical data schema do not also require a corresponding change in the front-end query application; rather, the abstraction provided by the framework can be modified to reflect the changes. Commonly assigned, U.S. patent application filed herewith entitled "Abstract Query Plan" discloses techniques for processing an abstract query that include generating an intermediate representation of an abstract query then used to generate a resolved query.

Using the database abstraction model, logical fields are defined that describe the data stored in an underlying database, including a federated environment where data is stored in multiple database systems. Users compose abstract queries by selecting logical fields and specifying conditions. The system then retrieves data by generating a resolved query of the underlying databases from the abstract query. Each logical field includes an access method that specifies how to retrieve data from an underlying database system corresponding to the logical field. If there is more than one source for data corresponding to the logical field, then multiple access methods may be defined for a single logical field, each one mapping it to a different database.

Simply having more than one access method per logical field and merging query results retrieved for each one, however, is inadequate to always retrieve the correct query results. That is, this approach does not necessarily ensure that the desired information is retrieved. Moreover, performing a query multiple times (once per data source), is inefficient, and also fails to account for the relationships data has with other tables in the underlying database. Relationships between tables, however, are fundamental to the organization of data in any relational database. Thus, if query results depend on the relationships about data spread across multiple data sources, iteratively performing a query for differently formatted databases will fail to retrieve the correct results. For example, a first logical field may map to demographic data stored in a single table of a database. Data from one column of the table is related to data in other columns on a row-by-row basis. A second logical field might map to logically similar demographic data stored in another database using two tables, and data is related between the two tables using a defined relationship, such as a patient ID stored in both tables. Without an indication of this relationship, linking data between the first database (using a single table) and the second database (using multiple tables) becomes impossible.

These kinds of differences in the format and schema of multiple database systems present challenges to creating a database abstraction model. Consider a research institution with multiple locations. Each location may maintain its own database system used to store logically similar information. Thus, each location may maintain a database that includes a demographic table (storing information about patients), a test table (storing results from tests), and so forth. Further, the database schema used at each location may use differently formatted tables. For example, a first location may use a single table to store patient demographic data, where a second location may subdivide patient demographic data over multiple tables. In such a scenario, the same patient may have data stored in databases at the multiple locations of the research institution. A logical field may be defined that retrieves data from each respective demographic table using multiple access methods. An abstract query that includes such a logical field may, therefore, map to multiple tables that have desired data. Because the multiple tables are organized differently, a simple union of data from each table may fail to produce desired query results.

Accordingly, there remains a need for techniques to construct a database abstraction model over multiple databases that store logically related or similar information using differently formatted physical tables.

SUMMARY OF THE INVENTION

Embodiments of the present invention provide methods for constructing a database abstraction model that includes logical fields that map to a logical table. The logical table is constructed using data extracted from multiple, differently formatted physical tables. The logical table allows logically related data stored in multiple databases to appear as data from a single table. Stated differently, data from multiple tables is treated as data from a single column in the logical table. Additionally, relationships between data stored in multiple, discrete databases are maintained. Further, multiple access methods that map to the multiple databases may be replaced with a single one that maps to the logical table. Data relationships that are defined for the database abstraction model are modified to reflect the logical table.

One embodiment of the invention provides a method of creating a data model of logically related data stored in multiple databases. The method generally includes, providing a database abstraction model that defines a plurality of logical fields, wherein each logical field provides a name for the logical field and at least an access method that maps the logical field to data in one of the multiple databases, and wherein the database abstraction model further defines a set of relationships between data stored in the multiple databases, and identifying at least one logical field that provides multiple access methods, wherein each access method maps to data stored in a different one of the multiple databases. The method generally further includes generating a logical table, wherein the logical table includes the data from each of the multiple databases referenced by the multiple access methods of the at least one logical field, replacing the multiple access methods for the at least one logical field with a single access method that maps the at least one logical field to the logical table, and updating the set of relationships to reflect relationships between the logical table and other data in the multiple databases.

Another embodiment of the invention provides a method for generating a logical table from multiple databases that store data in differently formatted physical tables. The method generally includes, providing a database abstraction model that defines a plurality of logical fields, wherein each logical field specifies a name for the logical field and at least an access method that maps the logical field to data in one of the physical tables, and identifying logical fields that specify multiple access methods that each map to a column of data stored in one of the multiple databases. And for each such access method, (i) identifying the differently formatted physical tables referenced by the multiple access methods, and (ii) adding, to a column of the logical table, data from columns of the differently formatted physical tables referenced by the multiple access methods. The method generally further includes, determining whether another logical field with multiple access methods references a column of data, from any of the physical tables, not already included in the logical table, and if so, adding that column of data to the logical table, and updating a database schema to include the logical table, wherein the database schema defines the relationships between data stored in the multiple databases and between the columns included in the logical table.

Another embodiment of the invention provides a computer-readable medium containing a plurality of instructions which, when executed on a computer system is configured to perform operations. The operations generally include, providing a database abstraction model that defines a plurality of logical fields, wherein each logical field provides a name for the logical field and at least an access method that maps the logical field to data in one of the multiple databases, and wherein the database abstraction model further defines a set of relationships between data stored in the multiple databases, and identifying at least one logical field that provides multiple access methods, wherein each access method maps to data stored in a different one of the multiple databases. The method generally further includes, generating a logical table, wherein the logical table includes the data from each of the multiple databases referenced by the multiple access methods of the at least one logical field, replacing the multiple access methods for the at least one logical field with a single access method that maps the at least one logical field to the logical table, and updating the set of relationships to reflect relationships between the logical table and other data in the multiple databases.

Another embodiment of the invention provides a computer-readable medium containing a plurality of instructions which, when executed on a computer system is configured to perform operations. The operations generally include a database abstraction model that defines a plurality of logical fields, wherein each logical field provides a name for the logical field and at least an access method that maps the logical field to data in one of the databases, and wherein at least one access method provides multiple access methods that each map to logically related data stored in a different one of the multiple databases, and identifying logical fields with multiple access methods that map to data stored in the multiple databases. And for each such access method identifying the differently formatted physical tables referenced by the multiple access methods, adding, to the logical table, data from the columns of tables referenced by the multiple access methods, and determining whether any other logical field with multiple access methods references a column from a table not already included in the logical table, and if so, adding the column to the logical table. The operations generally further include, updating a database schema to include the logical table, wherein the database schema defines the relationships between data stored in the multiple databases.

Another embodiment of the invention provides a system for processing abstract queries. The system generally includes a plurality of database systems, a database abstraction model that defines a plurality of logical fields, wherein each logical field defines a name for the logical field and at least an access method that maps the logical field to data in one of the database systems, and wherein the database abstraction model further defines a set of relationships between data stored in the plurality of database systems. The system generally further includes a user interface configured to allow a user to compose an abstract query from the plurality of logical fields, and a runtime component configured to receive an abstract query, and in response, to generate a resolved query of the plurality of database systems.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

The appended drawings, however, illustrate typical embodiments of the invention and, therefore, should not be considered limiting of its scope, for the invention may admit to other equally effective embodiments.

FIG. 6A illustrates a method for generating a set of relations between a logical table and other tables in an underlying physical database.

DETAILED DESCRIPTION OF THE PREFERRED EMBODIMENTS

Figure 1:
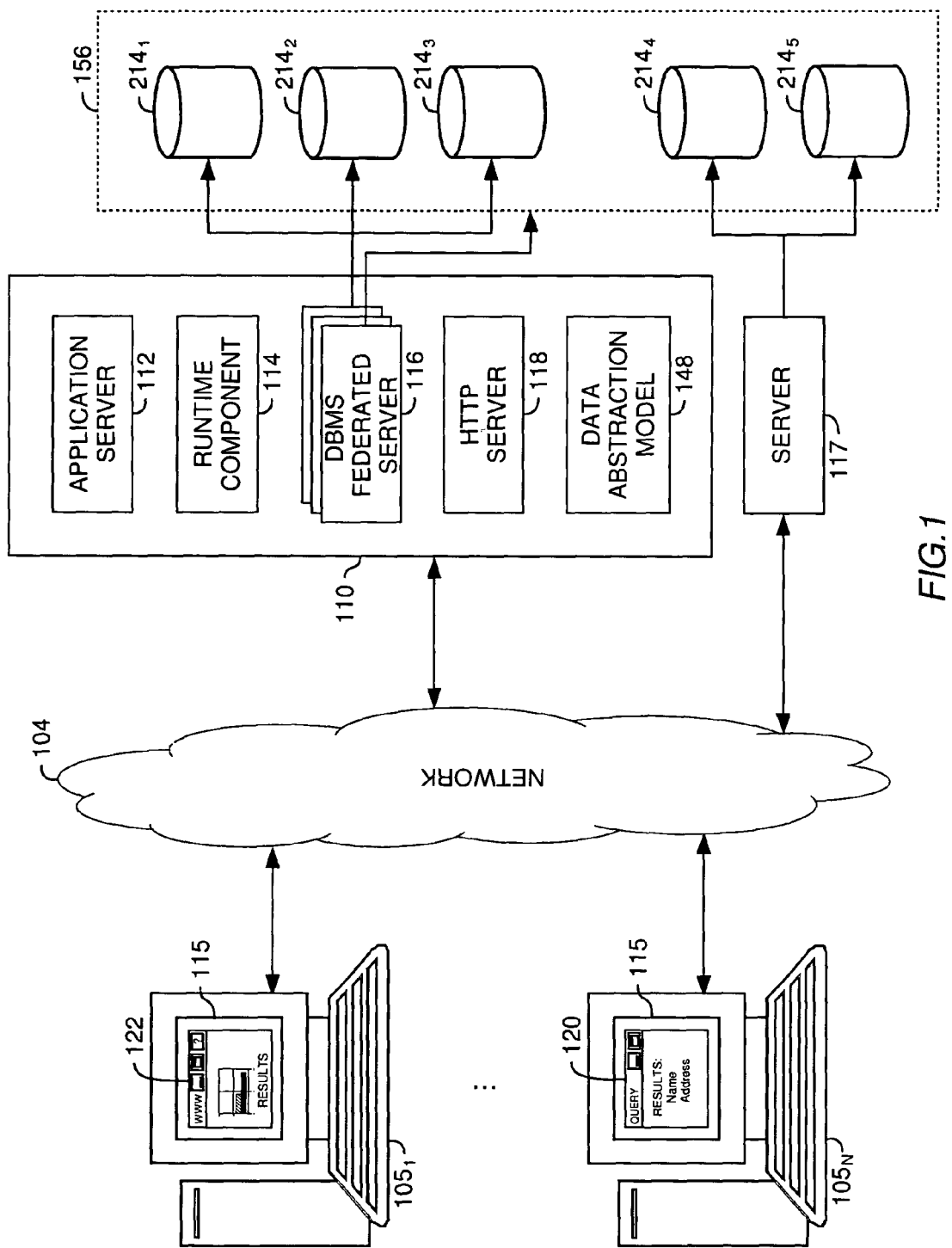
FIG. 1 illustrates a relational view of software and hardware components, according to one embodiment of the invention.

Embodiments of the present invention provide for a database abstraction model constructed over multiple databases that store logically related data. Data from multiple sources is used to construct a logical table that preserves the relationships between differently formatted tables present in the multiple databases. Tables may be differently formatted by using a different set of tables to represent the same data. That is, by using a different database schema. A logical table is a way of creating a "common denominator" among differently formatted physical tables that preserves the relationships between data in the logical table and other data in the multiple databases. Logical fields that use multiple access methods to map to data from the multiple databases are rewritten with a single access method that maps to the logical table.

Generally, the database abstraction model provides an interface to multiple underlying databases that conforms to a user's substantive view of data, instead of a view used by the underlying physical storage mechanism to represent the data. Behind the abstraction model is the set of underlying physical databases. When multiple data repositories include logically related information, embodiments of the invention generate a logical table that includes data taken from the multiple, underlying physical tables. Because the logically related data may be stored in different databases using different relational schemas, the logical table is more than a simple union of the multiple underlying tables. The logical table preserves the relationships that data from differently formatted tables has with other tables and with other data in the underlying databases. Thus, the logical table may be inserted into the database schema without disturbing the overall database schema.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways. The following description first describes the database abstraction model, and then describes the generation of a logical table that includes logically related data taken from multiple, differently formatted physical tables.

The Database Abstraction Model

FIG. 1 illustrates a networked computer system in a client-server configuration. Client computer systems $105_{1-N}$ include a network interface allowing them to communicate with other systems over network 104. The network 104 may comprise a local area network wherein both the client system 105 and server systems 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX®, FreeBSD, and the like) that manages the interaction between hardware components and higher-level software applications running on client system 105.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated. The server system 110 may include computer hardware components similar to those used by client system 105. Accordingly, the server system 110 generally includes a CPU, a memory, and a storage device connected to a bus (not shown). The server system 110 is also running an operating system, (e.g., a Linux® distribution, Microsoft Windows®, IBM's AIX®, FreeBSD, and the like) that manages the interaction between hardware components and software applications.

The computer systems illustrated in FIG. 1, however, are merely exemplary of one hardware/software configuration. Embodiments of the present invention may be implemented using other configurations, regardless of whether the computer systems are complex, multi-user computing systems, such as a cluster of individual computers connected by a high-speed network, single-user workstations, or network appliances lacking non-volatile storage of their own. Additionally, although described herein using a client/server network configuration, embodiments employing distributed computing or peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system 105, using web-browser 122. In such an embodiment, the server system 110 includes a Hypertext Transfer Protocol (http) server 118 (e.g., a web server such as the open source Apache web-sever program or IBM's Web Sphere® program) adapted to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105. The web-pages may include pages that present a query-building interface 115 to a user interacting with the system 110.

Alternatively, or in addition, client application 120 may provide a database front-end, or query application program running on client system $105_N$. The application 120, and query building interface 115, allows a user to compose an abstract query. In either case, the query building interface 115 allows users to compose a query according to a database abstraction model 148. The database abstraction model 148 defines the logical fields available for query composition. The query is submitted to the runtime component 114 which generates a resolved query of the databases 156.

As illustrated in FIG. 1, server system 110 may further include runtime component 114, DBMS server 116, and database abstraction model 148. Each of these components may comprise a software program (and data files) executing on the server system 110. The DBMS server 116 (or servers) generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116.

Databases 214 may exist on the local storage system of server system 110, or may be accessed over network 104 through remote server 117. Thus, the database abstraction model 148 may be constructed over both local and remote database systems. Database federation 156 (illustrated by the dashed lines) represents a union of local databases $214_{1-3}$ and remote databases $214_{3-4}$. Logically related data may be physically resident in multiple databases 214 that are part of the database federation 156.

In one embodiment, users compose an abstract query using logical fields defined by a database abstraction model 148. Each logical field may identify a field name and an access method. The access method identifies the underlying database (e.g., databases $214_{1-5}$) where the data is located, as well as the method for accessing the data in an underlying physical storage mechanism. Embodiments of the database abstraction model, logical fields, and access methods are described in greater detail in commonly owned co-pending application Ser. No. 10/083,075, filed Feb. 26, 2002, entitled "Application Portability and Extensibility through Database Schema and Query Abstraction" which is incorporated herein by reference in its entirety.

Runtime component 114 is configured to generate a query consistent with the physical representation of the data contained in one or more of the databases 214. In other words, the runtime component is the "transformational engine" used to generate the physical query (e.g., an SQL statement) from an abstract query. The runtime component 114 takes an abstract query composed by a user, identifies the information corresponding to each logical field included in the query, and generates a resolved query run by DBMS 116 against the underlying physical storage mechanism. In one embodiment, the runtime component 114 takes an abstract query and generates an abstract query plan corresponding to the abstract query, and then uses the abstract query plan to generate a resolved query. The resolved query is issued against the underlying databases $214_{1-5}$. Abstract query processing and abstract query plans are discussed in greater detail in a commonly owned application filed herewith, entitled "Abstract Query Plan".

Figure 2A:
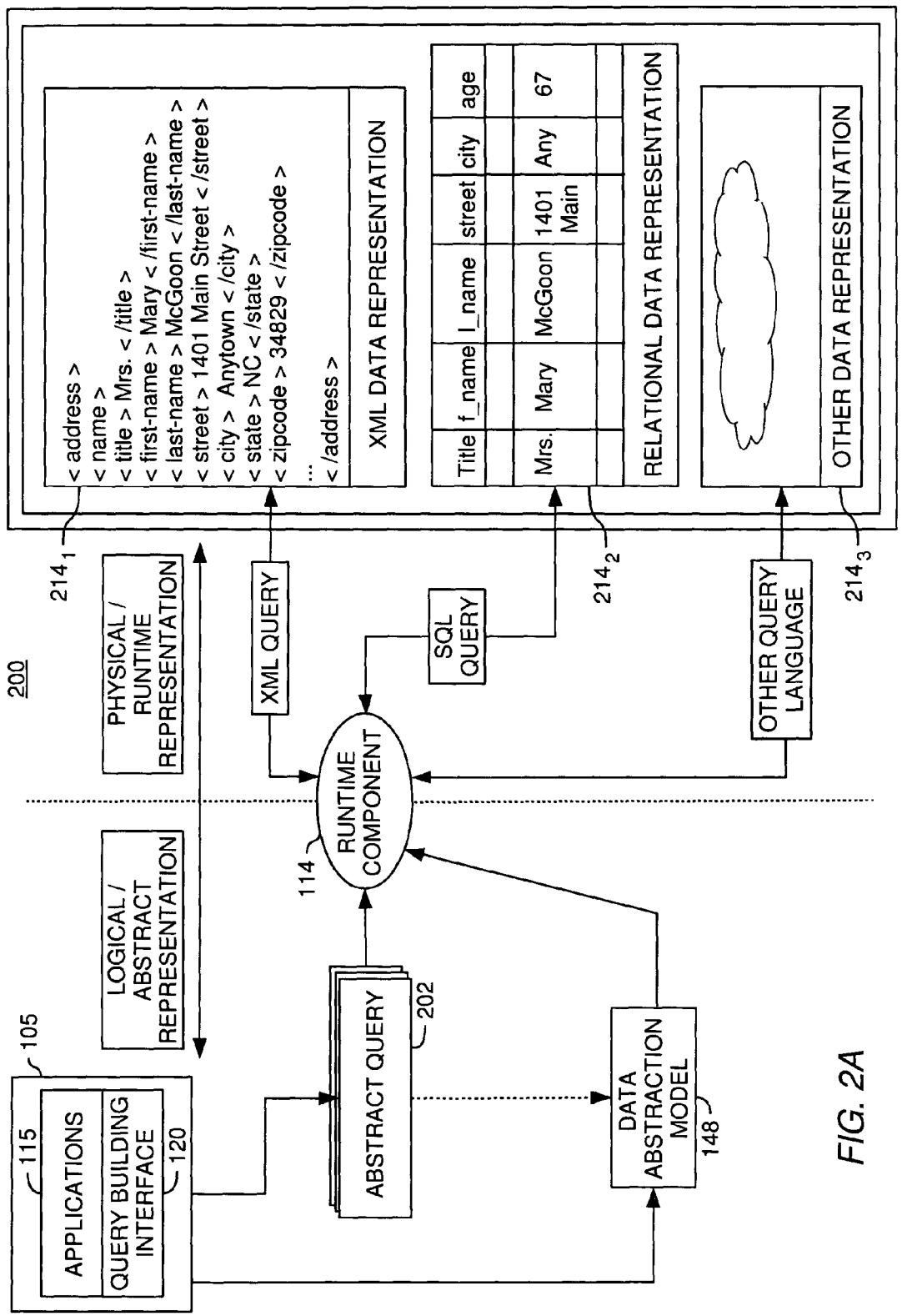
FIG. 2A illustrates a relational view of software components, according to one embodiment of the invention.

FIG. 2A illustrates a plurality of interrelated components of the invention, along with the transformation between the abstract view of the data of provided by the database abstraction model 148 (the left side of FIG. 2A), and the database systems 214 used to store data (the right side of FIG. 2A). In one embodiment, a requesting entity composes an abstract query 202 using query building interface 115. The query building interface may be provided by the application 120, or may be rendered as a web-page on web browser 122. The resulting query is generally referred to herein as an "abstract query" because it is composed from logical fields rather than by direct references to data entities in underlying databases $214_{1-5}$. As a result, abstract queries may be composed independently from the particular underlying data representation (e.g., a relational database and schema).

Figure 2B:
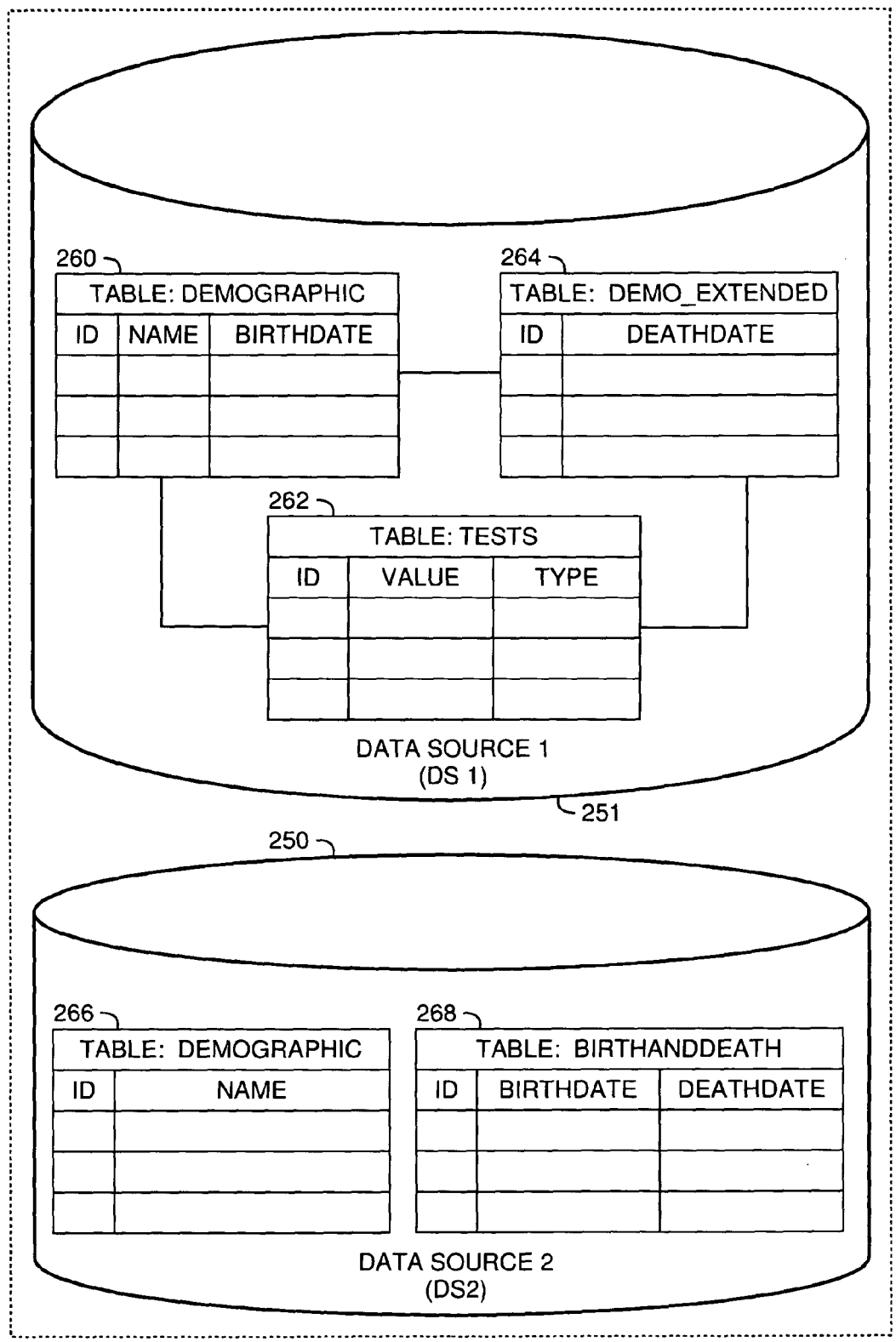
FIGS. 2B and 2C illustrate a set of databases and a database abstraction model constructed over a plurality of discrete databases, according to one embodiment of the invention.
Figure 2C:
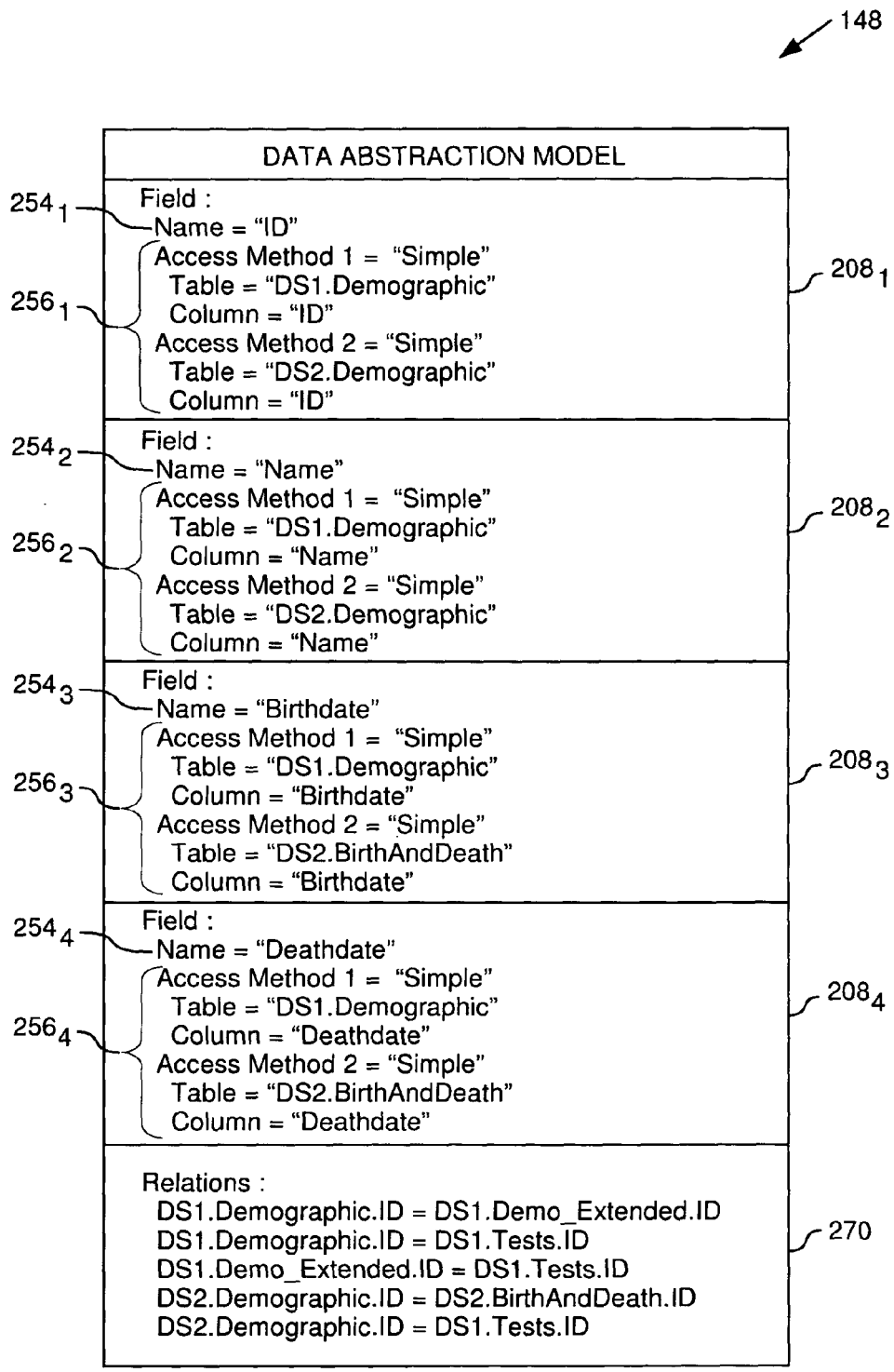

FIG. 2C further illustrates one embodiment of a database abstraction model 148. As illustrated, the database abstraction model 148 includes plurality of logical field specifications $208_{1-4}$ (four shown by way of example). Collectively, logical field specifications 208 create an abstraction over database 250 and 251. Each logical field 208 creates part of the abstraction. That is, each logical field relates a logical item of data to data stored in an underlying database, such as databases 250 and 251. In addition, embodiments of the invention provide for a logical field that retrieves data from multiple databases. The database abstraction model 148 further includes a relations section 270 that identifies the relationships between data elements stored in databases 250 and 251. As illustrated in FIG. 2C, the database abstraction model 148 includes the following relationships:

```
DS1.Demographic.ID = DS1.Demo_extended.ID
DS1.Demographic.ID = DS2.Demographic.ID
DS1.Demographic.ID = DS1.Tests.ID
DS2.Demographic.ID = DS2.BirthAndDeath.ID
```

Each of these relationships is used to relate data from two tables. In some cases, the tables maybe located in the same database, in others, the relationship may be between tables located in separate databases.

As illustrated in FIG. 2B, databases 250 and 251 each store logically related information relating to patients, but does so using a different database schema, and differently formatted database tables. Database 250 and database 251 may be located at geographically different locations, (e.g., $214_2$, and $214_4$ illustrated in FIG. 1). Database 250 includes three tables, each related by an ID value. Demographic table 260 includes ID, name, and birthdate columns. Demo_extended table 264 includes the ID column and a death date column. Finally, tests table 266 also includes the ID value, but further includes a test value (representing a value for a test result) column and a test type column (representing the type of test associated with the value).

Database 251 includes similar data, and the same patient may have data stored in both database 250 and 251, related by the patient ID value. The format of the tables, however, is different. Database 251 includes demographic table 266 that includes the name and ID columns, but omits the birthdate that is included in the demographic table in database 250. The birth and death table 268 includes the birthdate column, along with the ID column and death date column.

Database abstraction model 148 is constructed over databases 250 and 251. As illustrated, database abstraction model 148 and includes four logical field specifications 208 and relations data 270 that describes how data elements are related to one another. Logical field specifications 208 create an abstraction of the relational tables present in databases 250 and 251. Each logical field specification ("logical field" for short) includes a name and a reference to an access method that maps the logical field to data in databases 250 and 251. For example, logical field $208_2$ includes name $254_2$ "name" that refers to the name of a patient. Logical field $208_2$ includes two access methods. Access method 1 maps to a table and column in database 250 and access method 2 maps to database a table and column 251. Similarly, logical fields $208_1$, $208_3$, and $208_4$ each include two access methods. In addition, database abstraction model 148 includes relations section 270 that identifies the relationships between data stored in databases 250 and 251. The relations section 270 includes both relationships between columns from tables within one of the databases 250 (e.g., DS1.demographic.id=DS1.tests.id).

Although the access methods illustrated in the exemplary database abstraction model 148 employ a "simple" access method, other access methods are contemplated. For example, a logical field might be used to abstract a particular test type from a table that stores results for many different tests. Such a logical field could include a filter that specifies the results returned for the logical field should include only results for the specified test. Access method types are discussed in greater detail in both the '075 application and the Abstract Query Plan application referred to above.

Generating a Logical Table

Where multiple databases are used to store the same logical data (e.g., patient data stored in databases 250 and 251), embodiments of the invention may be used to generate a logical table using data taken from the multiple databases. Because logically related or similar data may appear in multiple tables from the underlying databases, a single logical field may specify multiple access methods (e.g., logical field specifications $208_{1-4}$, illustrated in FIG. 2C). For example, patient names are stored in tables 260 and 266. Further, demographic information is stored in databases 250 and 251 using differently formatted physical tables. Database 250 stores demographic data in a single table, whereas database 251 stores demographic data using two separate tables. In one embodiment, a logical table includes data taken from one or more physical tables (e.g., columns from databases 250 and 251) and forms a single column in the logical table. The multiple access methods may then be replaced with a single access method that maps a logical field to a column in the logical table that contains data from each of the multiple data sources containing logically related data.

Figure 3:
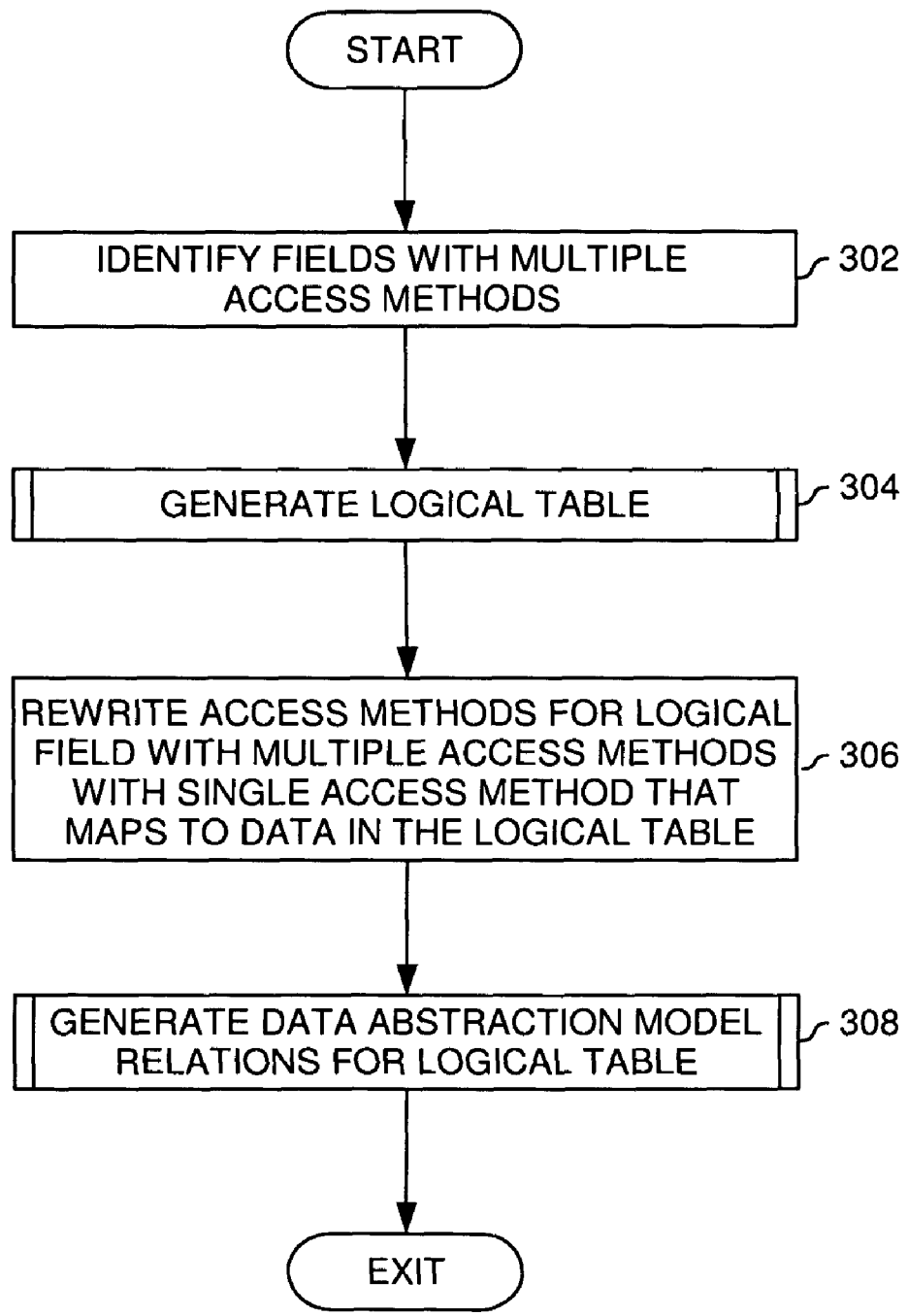
FIG. 3 illustrates a method used to allow data taken from multiple sources to appear to the database abstraction model as though it was all stored within a single database, according to one embodiment of the invention.

FIG. 3 illustrates a method 300 to generate a logical table using data taken from multiple sources (e.g., data from databases 250 and 251). The method 300 creates a logical table treated by the database abstraction model as though it was all stored within a single database. Additionally, embodiments of the invention may be used to merge multiple database abstraction models that use the same logical fields, but different access methods, to map to data. Operations 300 replace the multiple access method that map the logical field to differently formatted tables with a single access method that maps the logical field to a column in a logical table. This makes a logical table appear to the database abstraction model 148 and runtime component 114 to be a single physical table, without disturbing the relationships between the logical table and other tables in the underlying databases.

Operations 300 begin at step 302 where a logical field with multiple access methods is identified. Next, at step 304 a logical table is generated. In one embodiment, a logical table creates a "common denominator" table from different physical tables that preserves the relationships with other data in the multiple databases. One embodiment of a method to generate a logical table is described in reference to FIG. 4. At step 306, the logical field with multiple access methods identified in step 302 is rewritten so that the access method refers to the logical table generated at step 304. At step 308, the relationship data information defined by the relations section 270 is updated to reflect the newly generated logical table. Relationships to tables and columns now entirely contained by the logical table are removed, and relations that refer, in part, to columns incorporated into the logical table are rewritten to join the logical table to the rest of the underlying database. One embodiment of a method to update relations information is described in reference to FIG. 6.

Figure 4:
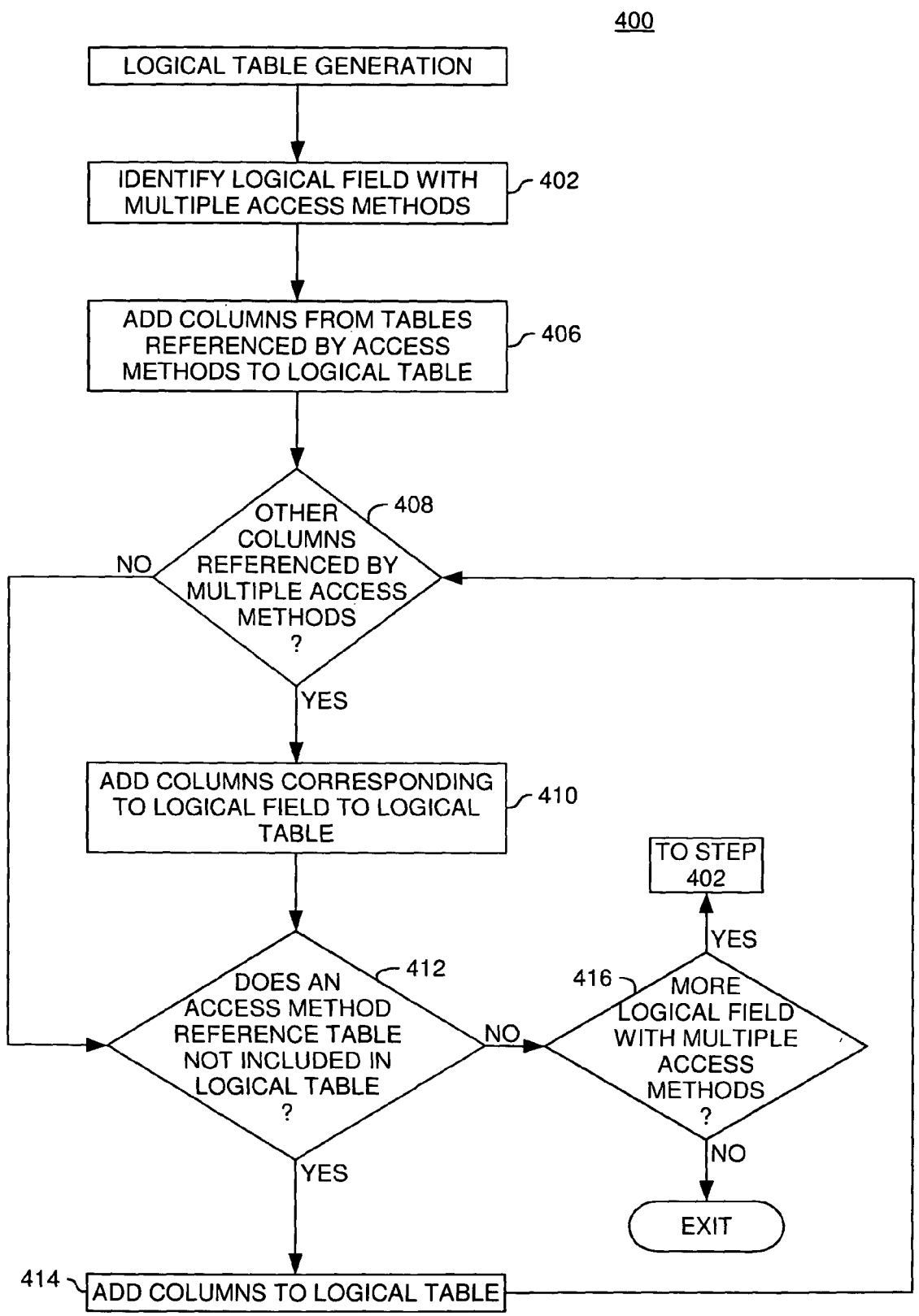
FIG. 4 illustrates a method for generating a logical table, according to one embodiment of the invention.

FIG. 4 illustrates exemplary operations 400 used to generate a logical table, according to one embodiment of the invention. Generating a logical table is illustrated as step 304 of FIG. 3. FIG. 4 is described herein with reference to the exemplary databases 250 and 251 illustrated in FIG. 2B. Also, FIGS. 5A-5F are described in conjunction with the method illustrated in FIG. 4. Operations 400 begin at step 402 where a logical field is identified that includes multiple access methods (which means there are multiple data sources with the target data for the logical field). Next, at step 406, the columns from the tables referenced by the multiple access method for the logical field identified at step 402 are added to the logical table. For example, starting with the "ID" logical field $208_1$, at step 406 the ID columns from table 260 from database 250 and table 266 from database 251 are added to the logical table.

Figure 5A:
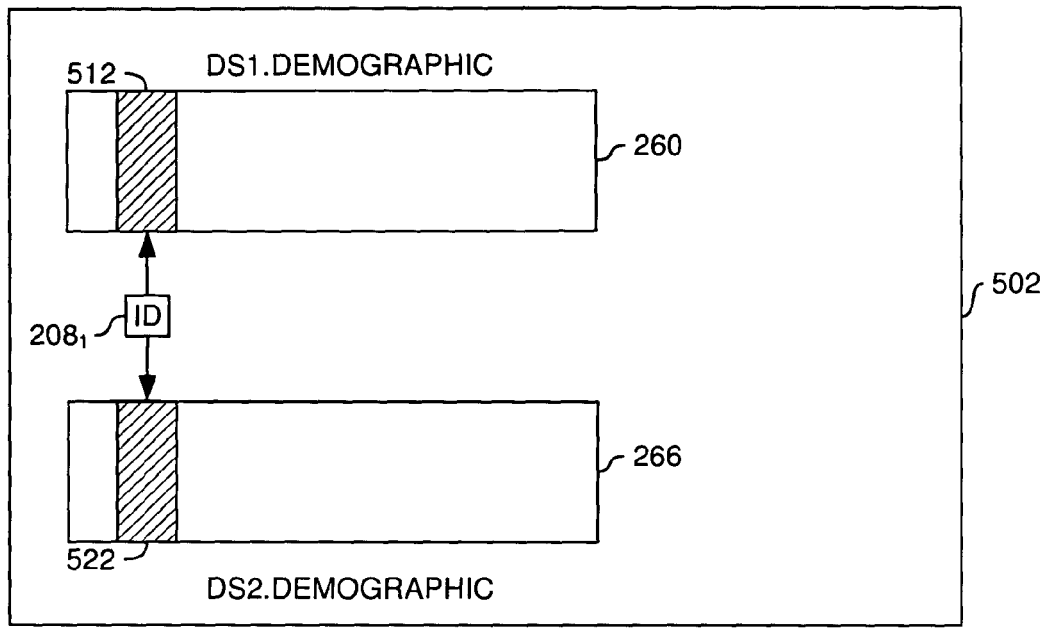
FIGS. 5A-5E illustrate logical table construction, according to the method illustrated in FIG. 4.
Figure 5B:
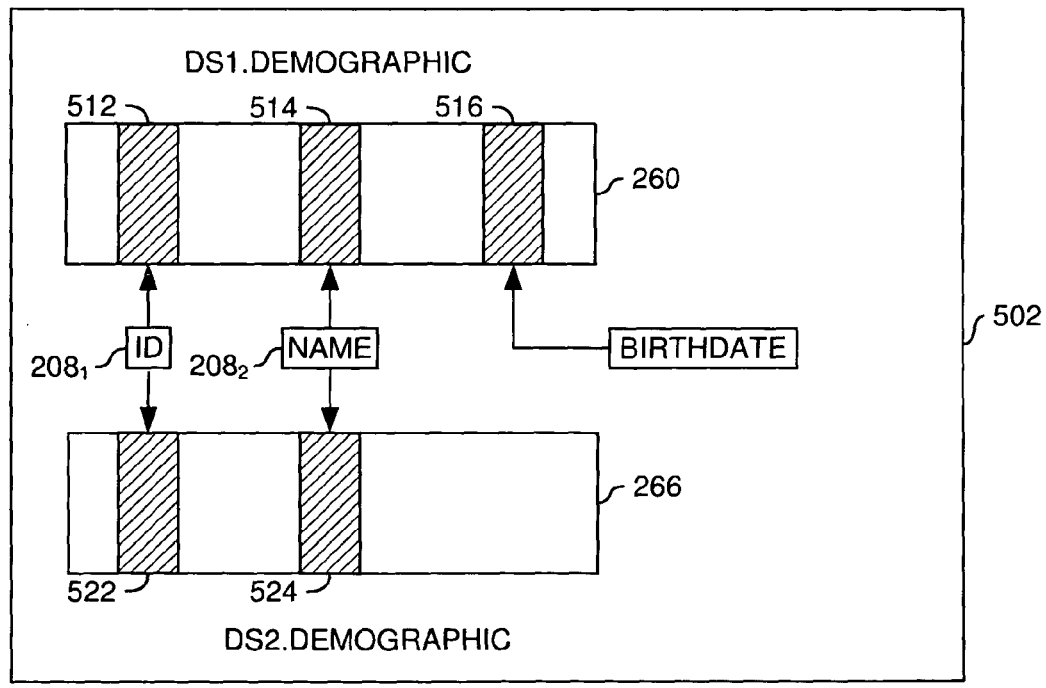

FIG. 5A illustrates the state of the logical table 502 after adding the tables referenced by ID logical field $208_1$. Specifically, ID column 512 from demographic table 260 and ID column 522 from demographic table 266 are added to the logical table. Returning to FIG. 4, after adding the columns from the logical field identified at step 402, the method queries whether other columns in the tables included in the previous step are referenced by other logical fields with multiple access methods at step 408. If so, then at step 410, columns corresponding to any such logical fields are added to the logical table 502. For example, FIG. 5B illustrates that demographic tables 260 and 266 each include the "name" column. Accordingly, at step 410, name columns 514 and 524 referenced by the multiple access methods name logical field $208_2$ are added to the logical table 502. In this example, only one additional column is added to the logical table at step 410, however, multiple columns could be added at this step, depending on the access methods and actual physical database databases involved.

Figure 5C:
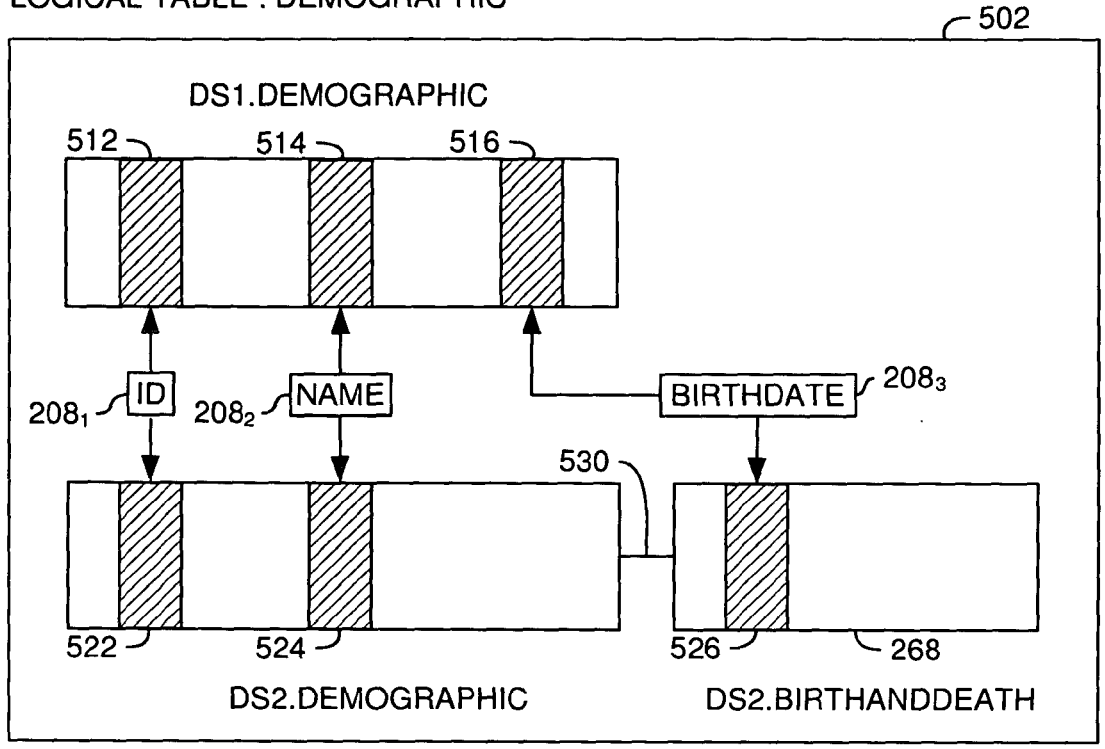

At step 412, the method 400 queries whether any columns included in the logical table are referenced by a logical field with multiple access methods that include a reference to a column from a table that has not been included in the logical table 502. For example, table 260 includes birthdate column 516. However, table 266 does not include a corresponding birthdate column. At step 414, the table referenced by the second access method from logical field $208_3$ is included in the logical table 502. FIG. 5C illustrates the state of the logical table 502 after including the table 268 from database 251. Table 268 includes the birthdate column 526 referenced by multiple access methods in logical field $208_3$.

Figure 5D:
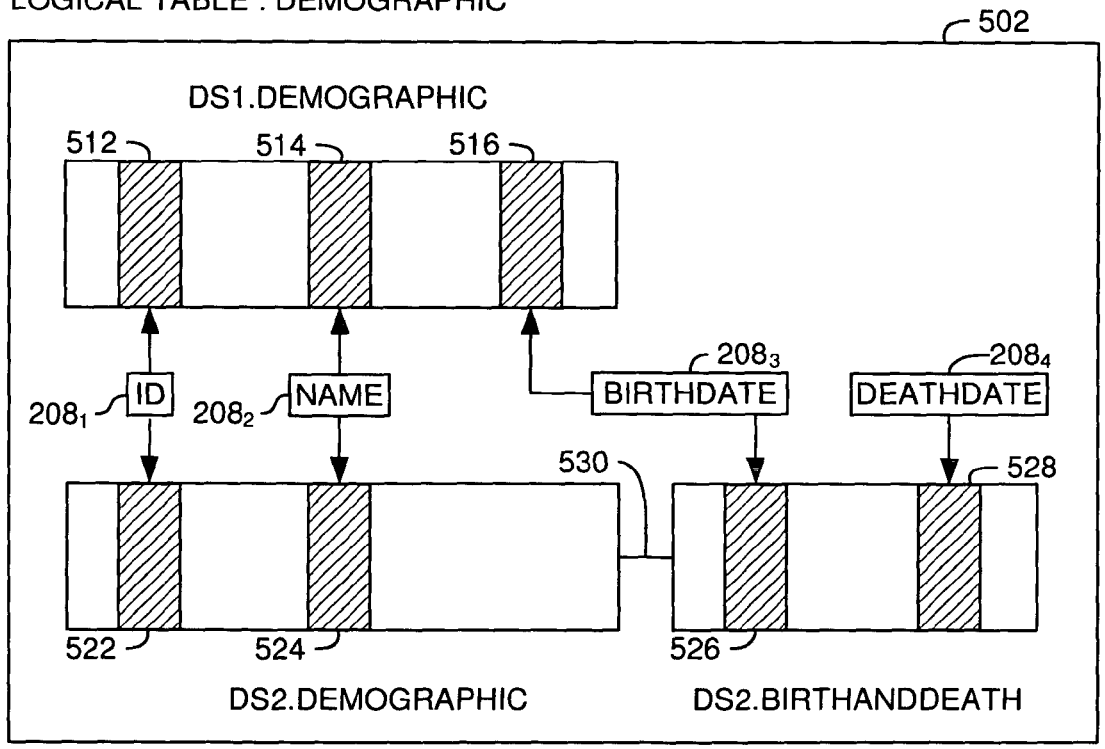
Figure 5E:
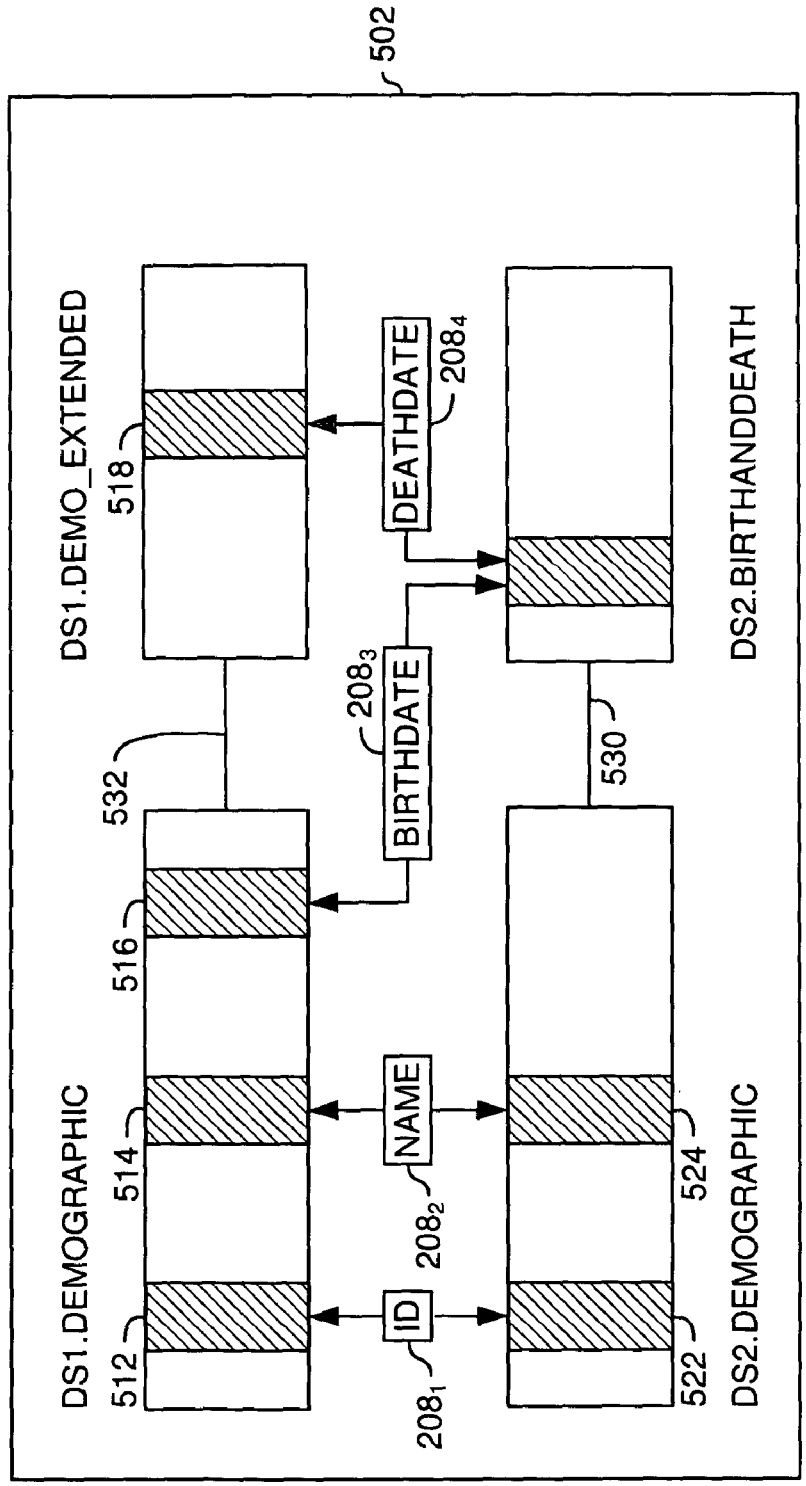

Operations 400 then return to step 408 and queries whether a table included in logical table 502 during step 414 itself includes other columns referenced by a logical field with multiple access methods. For example, FIG. 5D illustrates the death date column 528 from table 268 is referenced by logical field $208_4$. Operations 400 then repeat steps 412 and 414 to add the death date column 518 from table 264 to logical table 502. The added column from table 266 is illustrated in FIG. 5E. The death date column is now included. Also illustrated in FIG. 5E is the join relationship 532 between tables 262 and 266. Join relationship 532 preserves the relationship between these two tables that is not needed for the single table. From step 414, the method returns to steps 408, 410, and 412 with nothing more to add to the logical table. At step 416, the method 400 determines whether any logical fields with multiple access methods remain. If so, the method returns to step 402 and selects another logical field with multiple access methods for processing. Otherwise, the method ends at step 418.

Operations 400 generate a logical table 502 that includes data from multiple, differently formatted tables. In one embodiment, the logical table 502 may be represented using a stored SQL statement, such as a common table expression. During runtime execution, when data needs to be retrieved from the logical table, the stored SQL statement may be used. To generate this table with SQL, all of the tables of the top row (i.e., tables 260 and 264 in FIG. 5E) are joined together and "unioned" with the bottom row (i.e., tables 266 and 268) of tables joined together in logical table 502. Table I illustrates two exemplary SQL statements that may be used to represent the logical table 502 generated using operations 400 as further illustrated by FIGS. 5A-5E.

TABLE I

Example SQL select ID, Name, Birthdate, Deathdate from DS1.Demographic T1 left join DS2.Demographic_extended T2 on T1 .ID = T2.ID
union
select ID, Name, Birthdate, Deathdate from DS2.Demographic T3 left join DS2.BirthAndDeath T4 on T3.ID = T4.ID If tables from additional databases need to be joined to the logical table the process may be repeated. This may occur where more than two databases contain tables with logically related information and the corresponding logical field has three (or more) access methods.

Access Method Rewriting and Updating Database Relationships

Figure 6B:
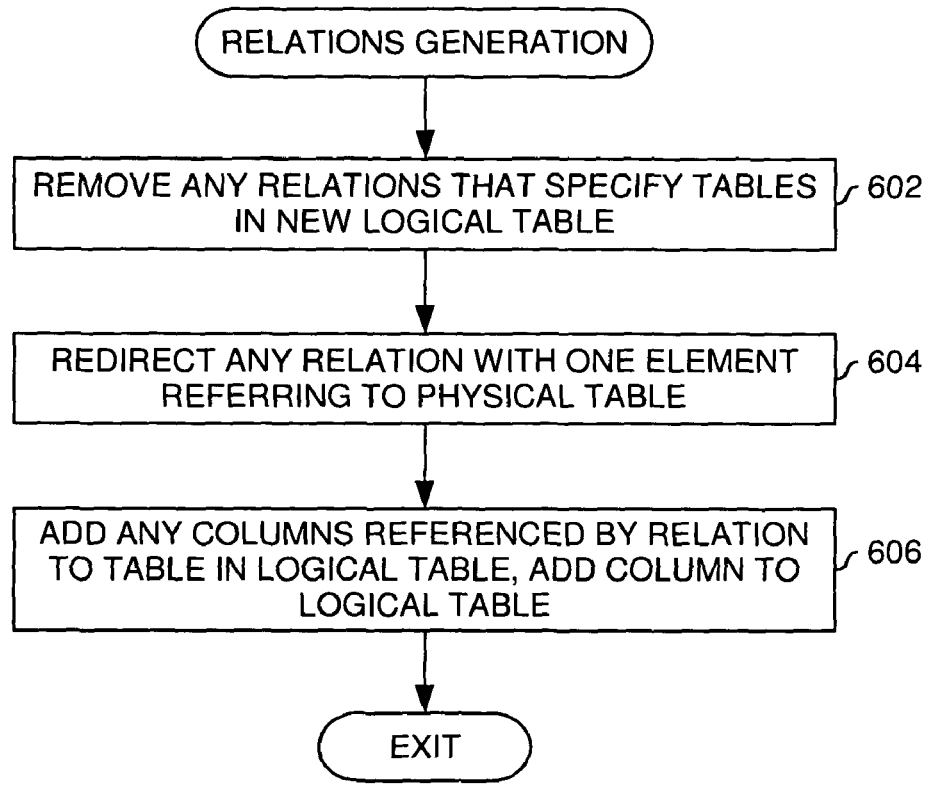
FIG. 6B illustrates an exemplary database abstraction model that includes references to a logical table, according to one embodiment of the invention.

Once logical table 502 is complete, the multiple access methods are replaced with a single access method that maps to logical table 502. FIG. 6A illustrates a rewritten data repository abstraction component 148 like the one first illustrated in FIG. 2B. Each logical field 208 now includes a single access method referencing a column in the logical table 502, and the logical fields "Name," "ID," Birthdate," and "Deathdate" all map to a column in logical table 502. In addition, the relationship of the logical table to other tables in the database is preserved using updated relations section 270. FIG. 6B illustrates a method 600 for rewriting the relations data included in a database abstraction model to reflect the logical table generated according to the method illustrated in FIG. 4. The relations data included in the database abstraction model 148 are updated to preserve the relationships in the database between the newly formed logical table and the other tables in the database.

Operations 600 begin at step 602 where any relationships 270 stored in the database abstraction model 148 that refer to tables in the logical table 502 are removed from relationships 270. That is, relationships between two columns that were included into the logical table are removed from the relationships 270. These relationships are now preserved in the structure of the logical table, and not needed for abstract query processing. At step 604, a relationship defined in relationships 270 that relates a column from a table outside the logical table 502 and a column inside the logical table is redirected to point to the logical table. For example, relationship 610 shown in FIG. 6B is rewritten as:

logtableschmea.demographic.id=DS1.tests.ID

Figure 7:
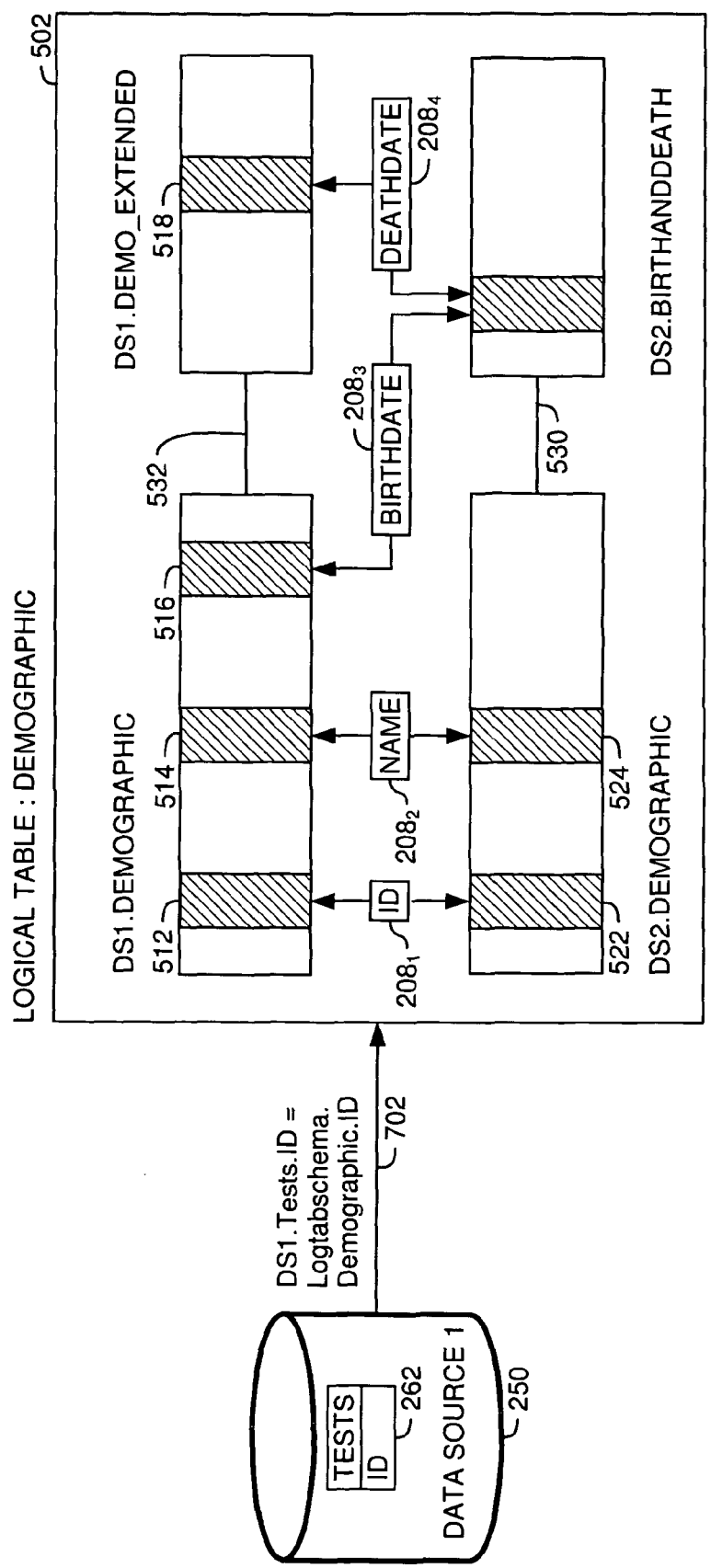
FIG. 7 illustrates a view of the relationship between data in a logical table generated according to the method of FIG. 4, and data from other data sources, according to one embodiment of the invention.

This changes the original relationship between table 260 and table 262 to a relationship between logical table 502 and tests table 262. FIG. 7 further illustrates the relationships using the logical table generated in FIGS. 5A-5E using the databases 250 and 251 first illustrated in FIG. 2.

If the relations reference a column that has not already been included in the logical table, that column is added to the logical table at step 606. A table included in the logical table may include a column referenced by a relation that is not referenced by a logical field with multiple access methods. For example, table 260 may include additional columns related to table 262.

FIG. 6A illustrates the database abstraction model 148 (from FIG. 2C) after the access methods have been rewritten and the relations information is updated. In this example relations 270 now include only a single entry:

logtabschema.Demograhic. ID=DS1.Tests. ID

In addition, logical field $208_1$ now includes a single access method that refers to the logical table 502 generated according to the methods described above. FIG. 7 illustrates this new relationship, along with completed logical table 502 in relation to the underlying databases 250. Relationship 702 indicates the relationship between data stored ID column of the logical table and the ID column of the tests table 262.

Once completed, the logical table may be referenced by an access method defined for a logical field as though it were part of the underlying database schema. All of the logically related data that originally appeared in multiple, differently formatted physical tables is now included in the logical table. Additionally, relationships between data included in the logical table, and between data in the logical table and other tables in the database, are preserved. Accordingly, when processing an abstract query, the runtime component 114 may generate a resolved query that references data stored in the logical table. The logically related data originally referenced using multiple access methods may be referenced using a single access method that maps to logical table 502.

The Completed Logical Table

Once completed, the logical table may be referenced by an access method defined for a logical field as thought it were part of the underlying database schema. All of the logically related data that originally appeared in multiple, differently formatted physical tables is now included in the logical table. Additionally, relationships between data included in the logical table, and between data in the logical table and other tables in the database, are preserved. Accordingly, when processing an abstract query, the runtime component 114 may generate a resolved query that references data stored in the logical table. The logically related data originally referenced using multiple access methods may be referenced using a single access method that maps to logical table 502.

While the foregoing is directed to embodiments of the present invention, other and further embodiments of the invention may be devised without departing from the basic scope thereof, and the scope thereof is determined by the claims that follow.

What is claimed is:

1. A method of creating a data model of logically related data stored in multiple databases comprising:
   providing a database abstraction model that defines a plurality of logical fields, wherein each logical field specifies a name for the logical field and at least one access method that maps the logical field to data in one of the multiple databases, and wherein the database abstraction model further defines a set of relationships between data stored in the multiple databases;
   identifying at least one logical field that specifies multiple access methods, wherein each access method maps to data stored in a different one of the multiple databases;
   generating a logical table, wherein the logical table includes the data from each of the multiple databases referenced by the multiple access methods of the at least one logical field;
   replacing the multiple access methods for the at least one logical field with a single access method that maps the at least one logical field to the logical table; and
   updating the set of relationships to reflect relationships between the logical table and other data in the multiple databases.

2. The method of claim 1, wherein the multiple databases comprise relational database systems.

3. The method of claim 2, wherein each of the multiple databases is constructed using a differently formatted set of tables used to store logically related data.

4. The method of claim 2, wherein the multiple databases include a local database system and a remote database system located at a remote location relative to the local database system.

5. The method of claim 2, wherein the relationships between data stored in the multiple databases comprise primary or foreign key relationships between columns of relational tables.

6. The method of claim 2, wherein the logical table comprises a relational table wherein each column of the logical table is an aggregation of the logically related data stored in the multiple databases.

7. The method of claim 2, wherein each relationship defined by the set of relationships comprises an indication of a first column from a first table and a second column from a second table, wherein the first column and second column store logically related data.

8. The method of claim 7, wherein updating the set of relationships comprises:
   removing, from the set of relationships, any relationship wherein both the first and second columns each specify a column included in the logical table; and replacing a first relationship with a second relationship, wherein the first relationship indicates a relationship between a column that is included in the logical table and a column from a table that is not included in the logical table, and wherein the second relationship indicates a relationship between the column that is not included in the logical table and a corresponding column of the logical table.

9. The method of claim 2, wherein generating the logical table comprises:
   identifying the tables referenced by the multiple access methods of the least one logical field;
   adding, to the logical table, data from columns from tables referenced by the multiple access methods of the least one logical field; and
   determining whether another logical field with multiple access methods references a column of data from a table not already included in the logical table, and if so, adding that column of data to the logical table.

10. The method of claim 2, wherein a stored SQL statement used to represent the logical table.

11. The method of claim 1, wherein providing a database abstraction model comprises, merging multiple database abstraction models created for different databases into to a single database abstraction model, wherein at least one logical field of the merged database abstraction model provides multiple access methods that each map to logically related data stored in a different one of the databases.

12. A method for generating a logical table from multiple databases that store logically related data in differently formatted physical tables, comprising:
providing a database abstraction model that defines a plurality of logical fields, wherein each logical field specifies a name for the logical field and at least an access method that maps the logical field to data in one of the physical tables;
identifying logical fields that specify multiple access methods that each map to a column of data stored in one of the multiple databases, and for each such access method:
identifying the differently formatted physical tables referenced by the multiple access methods;
adding, to a column of the logical table, data from columns of the differently formatted physical tables referenced by the multiple access methods; and
determining whether another logical field with multiple access methods references a column of data, from any of the physical tables, not already included in the logical table, and if so, adding that column of data to the logical table; and
updating a database schema to include the logical table, wherein the database schema defines the relationships between data stored in the multiple databases and between the columns included in the logical table.

13. A computer-readable storage medium containing a plurality of instructions which, when executed on a computer system is configured to perform operations comprising:
providing a database abstraction model that defines a plurality of logical fields, wherein each logical field provides a name for the logical field and at least an access method that maps the logical field to data in one of the multiple databases, and wherein the database abstraction model further defines a set of relationships between data stored in the multiple databases;
identifying at least one logical field that provides multiple access methods, wherein each access method maps to data stored in a different one of the multiple databases;
generating a logical table, wherein the logical table includes the data from each of the multiple databases referenced by the multiple access methods of the at least one logical field;
replacing the multiple access methods for the at least one logical field with a single access method that maps the at least one logical field to the logical table; and
updating the set of relationships to reflect relationships between the logical table and other data in the multiple databases.

14. The computer-readable storage medium of claim 13, wherein the multiple databases comprise relational database systems.

15. The computer-readable storage medium of claim 14, wherein the multiple databases include a local database system and remote database systems accessed at remote locations relative to the local database system.

16. The computer-readable storage medium of claim 14, wherein the relationships between data stored in the multiple databases comprise primary or foreign key relationships between tables in the multiple databases.

17. The computer-readable storage medium of claim 14, wherein the logical table comprises a relational table wherein each column of the logical table is an aggregation of the logically related data stored in the multiple databases.

18. The computer-readable storage medium of claim 14, wherein the each of the set of relationships comprise an indication of a first column from a first table and a relationship to a second column in a second table.

19. The computer-readable storage medium of claim 18, wherein updating the set of relationships comprises:
removing, from the set of relationships, any relationship wherein both the first and second columns each specify a column included in the logical table; and replacing a relationship between a first column from a table that is not included in the logical table and the second column from a table that is included in the logical table with a relationship between the first column and a corresponding column of the logical table.

20. The computer-readable storage medium of claim 14, wherein generating a logical table comprises:
identifying the tables referenced by the multiple access methods of the least one logical field;
adding, to the logical table, data from columns from tables referenced by the multiple access methods of the least one logical field; and
determining whether another logical field with multiple access methods references a column of data from a table not already included in the logical table, and if so, adding that column of data to the logical table.

21. The computer-readable storage medium of claim 13, wherein each of the multiple databases is constructed using a differently formatted set of tables used to store logically related data.

22. The computer-readable storage medium of claim 13, wherein providing a database abstraction model comprises merging multiple database abstraction models created for different databases into to a single database abstraction model, wherein at least one logical field of the merged database abstraction model provides multiple access methods that each map to logically related data stored in a different one of the multiple databases.

23. A computer-readable storage medium containing a plurality of instructions which, when executed on a computer system is configured to perform operations for generating a logical table from multiple databases that store data in differently formatted physical tables, comprising:
accessing a database abstraction model that defines a plurality of logical fields, wherein each logical field specifies a name for the logical field and at least one access method that maps the logical field to data in one of the physical tables;
identifying logical fields that specify multiple access methods that map to logically related data stored in the multiple databases, and for each such access method:
identifying the differently formatted physical tables referenced by the multiple access methods;
adding, to the logical table, logically related data from columns of the physical tables referenced by the multiple access methods; and
determining whether any other logical field with multiple access methods references a column of data, from any of the physical tables, not already included in the logical table, and if so, adding that column of data to the logical table; and updating a database schema to include the logical table, wherein the database schema defines the relationships between data stored in the multiple databases.

24. A computer, comprising at least one processor, for processing abstract queries, further comprising:

a plurality of database systems;

a database abstraction model that defines a plurality of logical fields, wherein each logical field specifies a name for the logical field and at least an access method that maps the logical field to data in one of the databases, and wherein at least one access method provides multiple access methods that each map to logically related data stored in a different one of the multiple databases;

a user interface configured to allow a user to compose an abstract query from the plurality of logical fields; and a runtime component, which when executed by the one or more processors is, configured to receive an abstract query, and in response, to generate a resolved query of the plurality of database systems and further configured to (i) generate a logical table, wherein the logical table includes the data from each of the plurality of database systems referenced by the multiple access methods of the at least one logical field; (ii) replace the multiple access methods for the at least one logical field with a single access method that maps the at least one logical field to the logical table; and (iii) update a set of relationships defined for the database abstraction model.

25. The computer of claim 24, wherein the plurality of database system includes at least on relational database system, and wherein the logical table comprises a relational table.

* * * * *